US006463490B1

United States Patent
Wang et al.

(10) Patent No.: US 6,463,490 B1
(45) Date of Patent: Oct. 8, 2002

(54) DUAL DATA RATE TRANSFER ON PCI BUS

(75) Inventors: Hsuan-Yi Wang, Hsin-Tien; Sheng-Chang Peng, Taipei; Nai-Shung Chang, Chung-Ho, all of (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/447,724

(22) Filed: Nov. 24, 1999

(30) Foreign Application Priority Data

Mar. 10, 1999 (TW) ........................................ 88103699 A

(51) Int. Cl.$^7$ ............................................... G06F 13/12
(52) U.S. Cl. ...................... 710/110; 710/107; 710/309; 710/314; 710/58; 710/35
(58) Field of Search ................................ 710/107, 110, 710/118, 125, 305, 309, 314, 29, 31, 36, 35, 58, 240, 306, 308, 311; 713/600

(56) References Cited

U.S. PATENT DOCUMENTS

| | | | |
|---|---|---|---|
| 5,091,845 A | * 2/1992 | Rubinfeld | 711/100 |
| 5,790,811 A | 8/1998 | Hewitt | |
| 5,796,963 A | * 8/1998 | Odom | 710/305 |
| 5,857,083 A | * 1/1999 | Venkat | 710/311 |
| 5,978,869 A | * 11/1999 | Guthrie et al. | 710/60 |
| 6,033,441 A | * 3/2000 | Herbert | 769/400 |
| 6,049,894 A | * 4/2000 | Gates | 714/41 |
| 6,233,636 B1 | * 5/2001 | Kelley et al. | 710/305 |

OTHER PUBLICATIONS

PCI Local Bus Bios Specification, Revision 2.1, Aug. 26, 1994 (In substitution for PCI Local Bus Specification, Revision 2.1, 1995).

* cited by examiner

Primary Examiner—Peter Wong
Assistant Examiner—Raymond N Phan
(74) Attorney, Agent, or Firm—Knobbe, Martens, Olson & Bear, LLP

(57) ABSTRACT

The invention provides a method of performing data transfers on a PCI bus between a PCI bus master and a selected device. Wherein, there is a request signal and a grant signal on the PCI bus for a read/write transaction, and during the read/write transaction, the request signal and the grant signal are idle. The method comprises the steps of: (a) driving a first ready signal by the PCI bus master; (b) driving a second read signal by the selected device in response to the first ready signal, which initiates the read/write transaction; (c) using the request signal and the grant signal as a data transfer strobe signal during the write and read transaction, respectively, the data transfer strobe signal has a plurality of clocks; and (d) performing the data transfers on rising and falling edges of the clocks of the data transfer strobe signal.

11 Claims, 8 Drawing Sheets

DUAL DATA RATE TRANSFER ON PCI BUS

FIELD OF THE INVENTION

The invention is related to data transferring on a PCI bus and more particularly to a method and system of transferring data on a PCI bus at a dual data transfer rate.

DESCRIPTION OF THE RELATED ART

An early personal computer(PC) system transferring data between different bus devices on a single bus, typically as the 16-bit ISA bus and 32-bit EISA bus. However, it is difficult to speed up data transferring on these buses because of the limitation of the bit rate and width.

In addition, a bus named Peripheral Component Interconect Bus (PCI Bus) is provided for the computer system having a processor and the above ISA and EISA bus, which is characterized by higher data transferring rate.

At present, the computer system with a PCI bus includes a Host/PCI bus bridge ("host bus bridge" for short here) and a PCI/Expansion bus bridge ("expansion bus bridge" for short here). The former manages data transferring between the PCI bus, the processor and the main memory while the latter manages data transferring between the PCI bus and the expansion bus bridge. In this configuration, it is the host bus bridge through which data is transferred between the main memory and the devices coupled to the PCI bus. Similarly, through the expansion bus bridge and the PCI bus, the devices coupled to the expansion bus transfer data to or from the devices coupled to the PCI bus, and through the host bus bridge, the expansion bus bridge and the PCI bus, transfer data to or from the processor and the main memory.

The PC system 10 shown in FIG. 1, for example, mainly includes a processor 12, a host bus 14, a Host/PCI bus bridge 16, a PCI bus 18, a PCI/Expansion bus bridge 20 and an expansion bus 22.

Wherein the processor 12 provides various processing signals and performs calculations, operation control and the ordinary works of a processor. Furthermore, the processor 12 is coupled to the host bus 14 and the host bus bridge 16 provides an interface between the host bus 14 and the PCI bus 18. As for the expansion bus bridge 20 and bus devices 26 having interfaces conformable to the PCI bus specifications such as The PCI Local Bus Specification, Rev 2.1, 1995, they are coupled to the PCI bus 18. Wide-bandwidth bus devices 26 generally include input/output devices such as a graphic device 26a, a LAN device 26b, a SCSI device 26c and the like. A typical narrow-bandwidth bus device such as a based I/O function device 28 is coupled to the expansion bus 22. Among various bus devices, those having active access to the memory can be PCI bus masters and the others are merely PCI bus slaves.

The host bus bridge 16 generally include an arbitrator used for arbitrating the competition between the masters for access to the memory so that the one which gains the ownership of the PCI bus 18 is determined. For instance, when various masters desire the access to the memory, each will send a request signal to the arbitrator which determines who will be the winner and granted the ownership of the PCI bus 18 according to the arbitration protocol. Subsequently, the winning master substantially control the PCI bus.

The PCI bus master 27 coupled to the PCI bus 18, for example, is characterized by including a processor with an internal clock signal by which the master operates and having the ability to initialize and control the operation of the PCI bus.

In addition to establishing communications between the processor 12 and the PCI bus 18 and arbitrating the competition for the ownership of the PCI bus 18, the functions of the host bus bridge 16 further comprise establishing communications between the memory 24 and the processor 12, and between the memory 24 and the PCI bus 18.

The expansion bus bridge 20 is coupled to the PCI bus 18 and the expansion bus 22 to manage the data transferring, the control signals and address signals between the devices coupled to the PCI bus 18 and the expansion bus 22. The expansion bus bridge 20 also comprises an arbitrator used for arbitrating the competition between the bus devices 28 coupled to the expansion bus 22, wherein the bus devices 28 and the expansion bus 22 are conformable to the specifications of ISA, EISA or MCA.

As shown in FIG. 2, a PCI interface between the host bus bridge 16 and the expansion bus bridge 20, for example, includes a multiplexed Address/Data signal, AD, a Bus Command/Byte Enables signal, CBE, interface control signals including a Cycle Frame signal, FRAME#, an Initiator Ready signal, IRDY#, a Target Ready signal, TRDY#, a Device Select signal, DEVSEL# and a Stop signal, STOP#, and arbitration signals including a PCI Grant signal, PGNT# and a PCI Request signal, PREQ#.

With reference to FIG. 4, a timing diagram of data transferring on the PCI bus 18 is shown.

In addition, as shown in Table 1, complete data transferring on a PCI bus includes an arbitration phase, an address phase and a plurality of data phase. During each of the phases, each signal has a logic level such as logic low, L, logic high, H and floating, X. Besides, according to the timing diagram in FIG. 4, the signals are sampled on the rising edges of PCLK, which are indicated by the dotted vertical lines. A # symbol at the end of a signal name indicates that the active state occurs when the signal is at a low voltage.

Refer to FIG. 4 together with FIG. 1 and 3, wherein an example illustrating that the expansion bus bridge 20 becoming a master by winning the ownership of the PCI bus writes or reads the memory through a target (i.e. a selected device) such as the host bus bridge 16. The procedure of data transferring includes:

According to the step S10, PREQ# of the master is asserted.

According to the step S12, proceed to the next step when PGNT# of the arbitrator is asserted.

According to the step S14, FRAME# of the master is asserted and the master begins to drive the address signal AD.

According to the step S16, proceed to the next step when DEVSEL# of the target is asserted.

According to the step S18, when TRDY# of the target is asserted, the target begins to drive the data signal AD and the first data transfer occurs on the next rising edge of PCLK.

According to the step S20, proceed to the next step when the current data phase is the last one of the current transaction. According to step S22, FRAME# and PREQ# of the master are deasserted. According to step S24, PGNT# of the target is deasserted. Finally, According to step S26, the current transaction ends and the data transferring is completed. Wherein a read or write transaction starts with an address phase when FRAME# is asserted. During the address phase, AD contain a valid address and CBE contain a valid bus command. In addition, during a write transaction, IRDY# indicates that valid data is present on AD. During a read transaction, it indicates the master is prepared to accept data. Correspondingly, during a read transaction, TRDY# indicates that valid data is present on AD. During a write transaction, it indicates the target is prepared to accept data.

STOP# indicates the current target is requesting the master to stop the current transaction. (It is not asserted in the present example.)

However, one of the problems of the conventional system described above is the lack of the bandwith caused by the buck data transferring of the devices with high transfer rates coupled to the expansion bus bridge, such as IDE-DMA66. To solve the above problem, a method of transferring data in PCI idle clock cycles is provided in the U.S. Pat. No. 5790811.

SUMMARY OF THE INVENTION

As an alternative way to solve the problem described above, a method and system of transferring data on a PCI bus are provided in the present invention. Wherein an idle signal not in used during the bus transaction(i.e. during the data phases) is driven into a data transfer strobe signal which comprises a plurality of clocks. Furthermore, the number of clocks matches with the number of the data transfers which occur on the rising and falling edges of the clocks. Consequently, transferring data on a PCI bus at a dual data transfer rate is possible.

Additionally, PREQ# of the PCI bus master is driven into a data transfer strobe signal during a write transaction while PGNT# of the target is driven into a data transfer strobe signal during a read transaction. In both cases, the data transfers occur on the rising and falling edges of the data transfer strobe signal.

According to one of the embodiments of the invention, a method of transferring data on a PCI bus is used in a computer system having a PCI bus master and a target, wherein the system includes a PCI clock signal, a request signal and a grant signal. The request and grant signal are idle during the bus transaction. The request signal of the master is driven into a data transfer strobe signal during a write transaction while the grant signal of the target is driven into a data transfer strobe signal during a read transaction. The data transfer strobe signal comprises a plurality of clocks and the number of clocks matches with the number of the data transfers which occur on the rising and falling edges of the clocks.

BRIEF DESCRIPTION OF THE DRAWINGS

The following detailed description together with the drawings listed below describe one of the embodiments of the method and system of transferring data on a PCI bus according to the invention.

DESCRIPTION OF THE PREFERRED EMBODIMENTS

Figure 5:
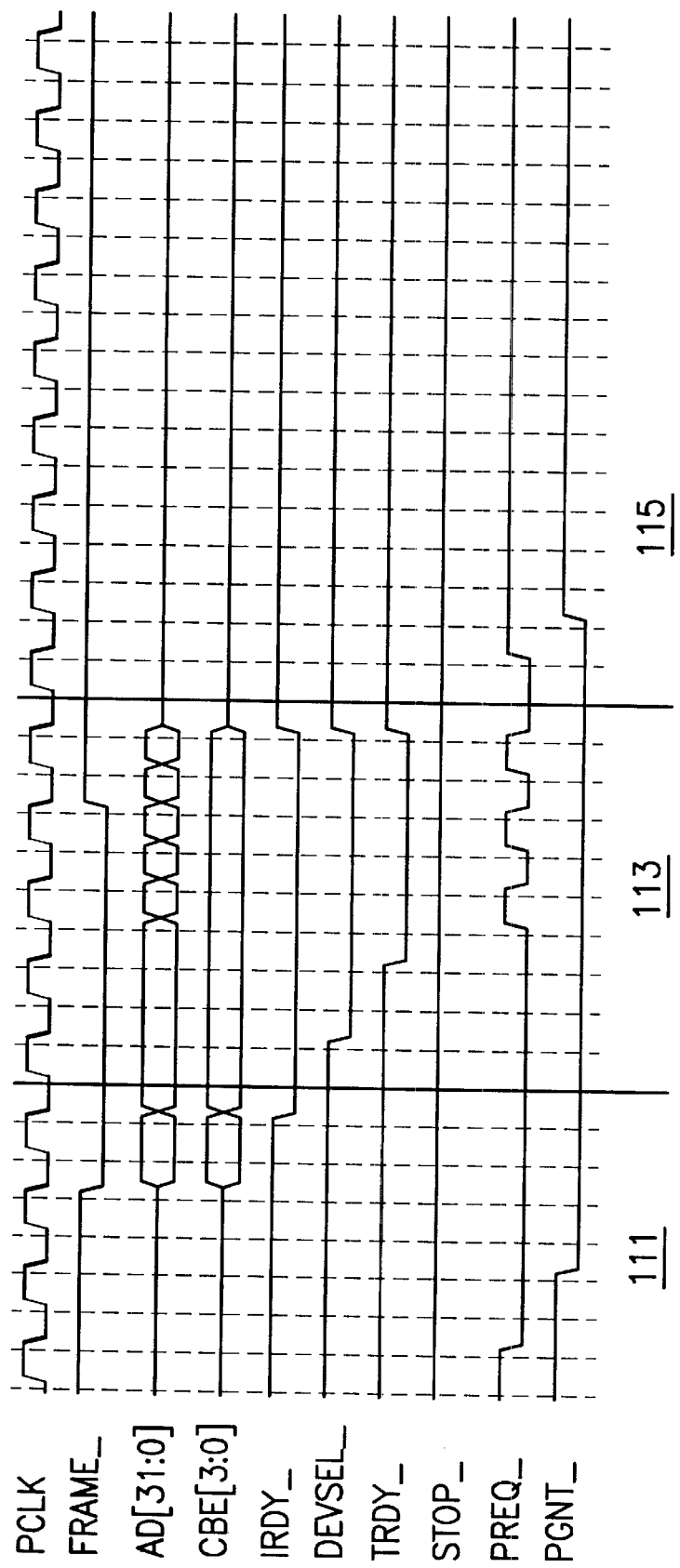
FIG. 5 is a timing diagram of data transferring for a write transaction according to one of the embodiments of the invention.
Figure 6:
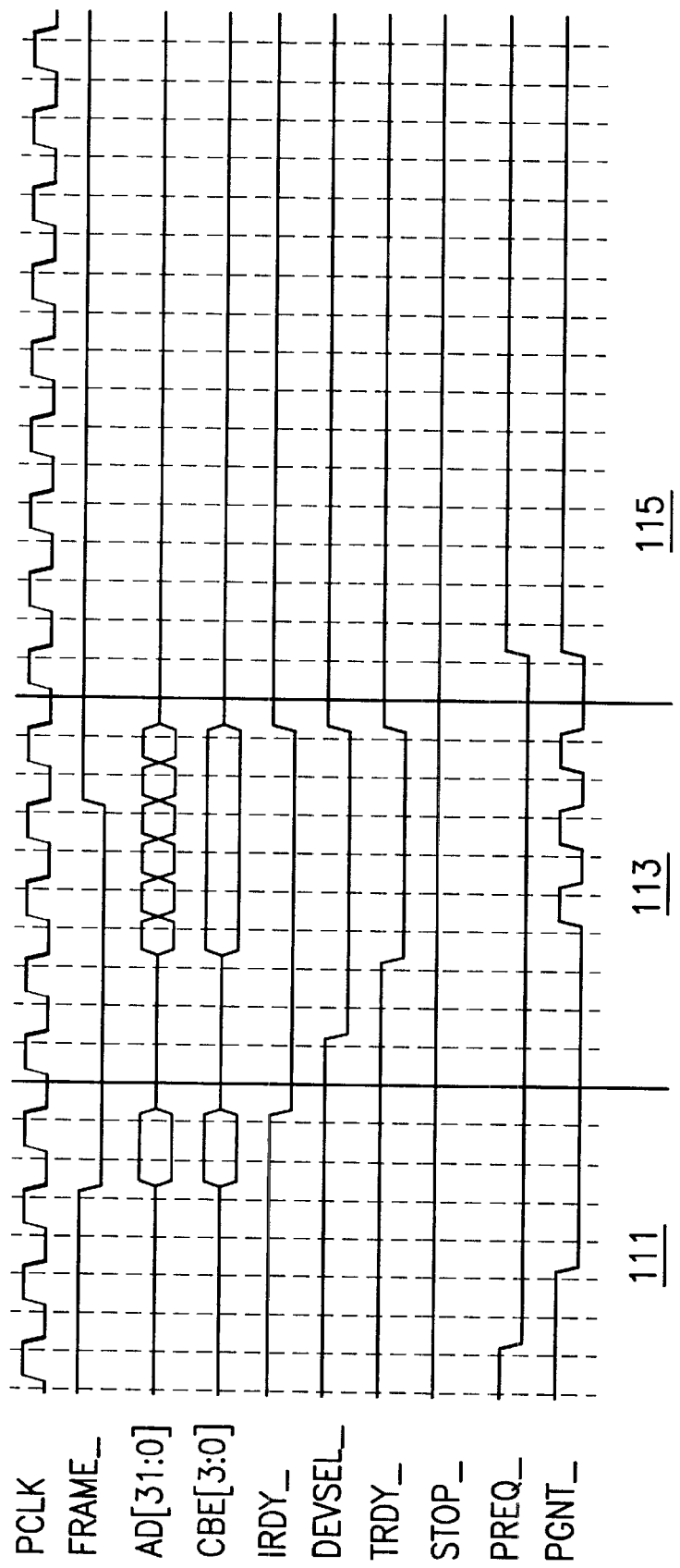
FIG. 6 is a timing diagram of data transferring for a read transaction according to one of the embodiments of the invention.

Refer to FIG. 5 and 6, wherein the timing diagrams of data transferring on the PCI bus 18 according to one of the embodiments of the invention are shown.

Additionally, as shown in Table 2, complete data transferring on a PCI bus generally includes an arbitration phase, an address phase and a plurality of data phases. During each of the phases, each signal has a logic level such as logic low, L, logic high, H and floating, X. Besides, according to the timing diagrams in FIG. 5 and 6, the control signals are sampled on the rising edges of PCLK, which are indicated by the dotted vertical lines. While the data signal is driven on both the rising and falling edges of the clocks of PGNT#/PREQ# which has been driven into a data transfer strobe signal during the bus transaction. A # symbol at the end of a signal name indicates that the active state occurs when the signal is at a low voltage.

Wherein, PREQ# and PGNT# are idle after the address phase(i.e. during the transaction)originally. Compared with the conventional system by comparison between Table 1 and 2, this embodiment of the invention use a signal driven from PREQ# or PGNT# rather than use PCLK as a data transfer strobe signal. According to FIG. 5 and 6, PREQ#/PGNT# which is originally an arbitration signal (having a level H in the example) in the arbitration phase 111 is driven into a data transfer strobe signal in the data phase 113. It is not until FRAME# is deasserted(i.e. FRAME# has a level H for the last data phase) that PREQ#/PGNT# returns to an arbitration signal in the arbitration phase 115.

As previously described, the PCI interface uses an arbitration scheme, where each master has a unique request (PREQ#) and grant(PGNT#) signal. A simple request-grant handshake is used to gain access to the bus. Thereby, a better device-to-device or point-to-point driving ability is provided, which makes the loading small and unvaried. PREQ#/PGNT# is suitable for a data transfer strobe signal in a non-arbitration phase such as a data phase, which is advantageous for the design of a high bandwidth device such as a PCI bus with a frequency of 66MHz.

That is to say, PREQ# of the PCI bus master is driven into a data transfer strobe signal when the PCI bus master writes data into the memory while PGNT# of the target is driven into a data transfer strobe signal when the PCI bus master reads data from the memory. In both cases, the data transfers occur on the rising and falling edges of the data transfer strobe signal. Consequently, transferring data on a PCI bus at a dual data transfer rate is possible.

Figure 7:
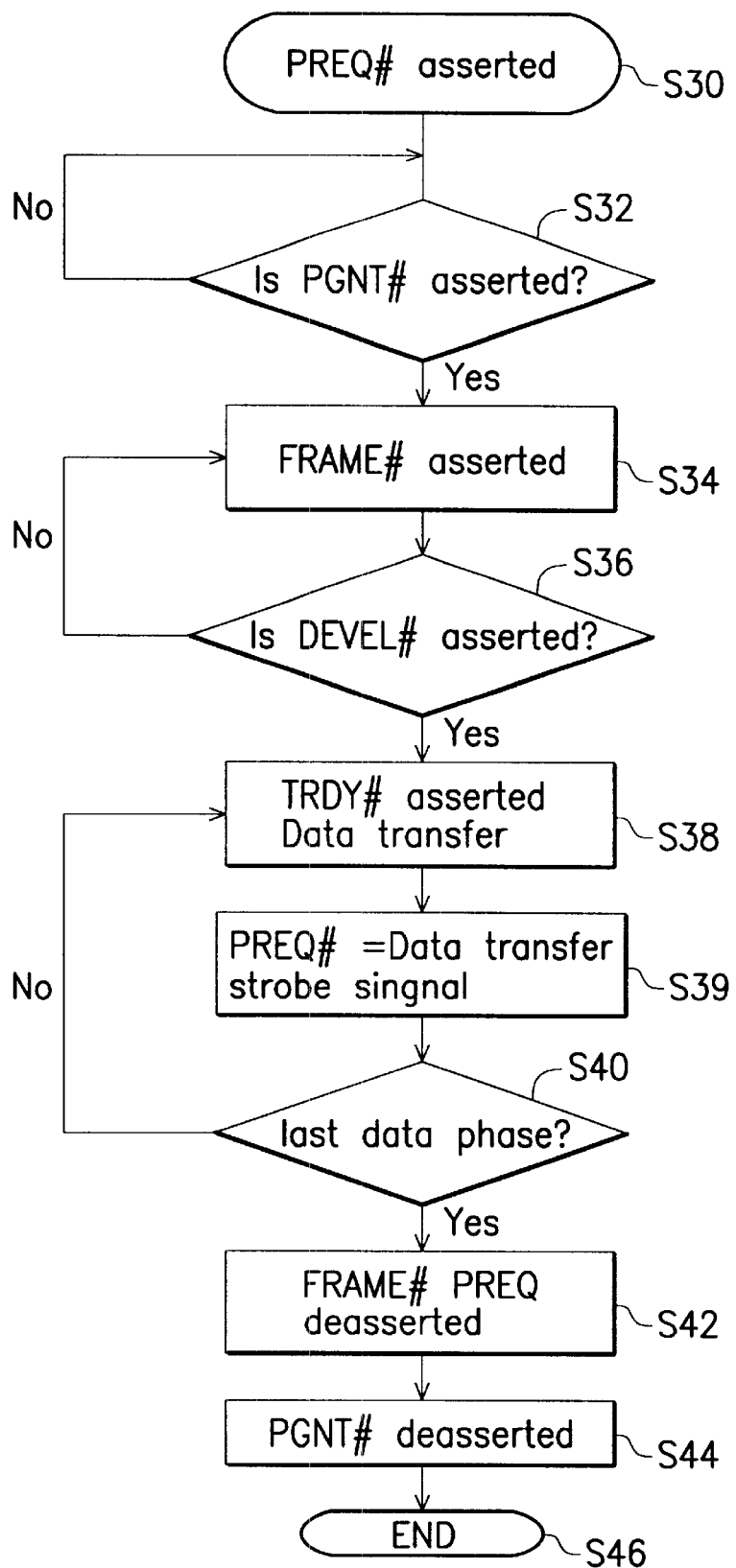
FIG. 7 is a flow chart of data transferring for a write transaction according to one of the embodiments of the invention.

Refer to the timing diagram in FIG. 5 together with FIG. 7, wherein an embodiment illustrating that the expansion bus bridge 20 becoming a master by winning the ownership of the PCI bus writes the memory through a target (i.e. a selected device) such as the host bus bridge 16. The procedure of data transferring includes:

According to the step S30, PREQ# of the master is asserted.

According to the step S32, proceed to the next step when PGNT# of the arbitrator is asserted.

According to the step S34, FRAME# of the master is asserted and the master begins to drive the address signal AD.

According to the step S36, proceed to the next step when DEVSEL# of the target is asserted.

According to the step S38, when TRDY# of the target is asserted, the target begins to drive the data signal AD and the first data transfer occurs.

Figure 1:
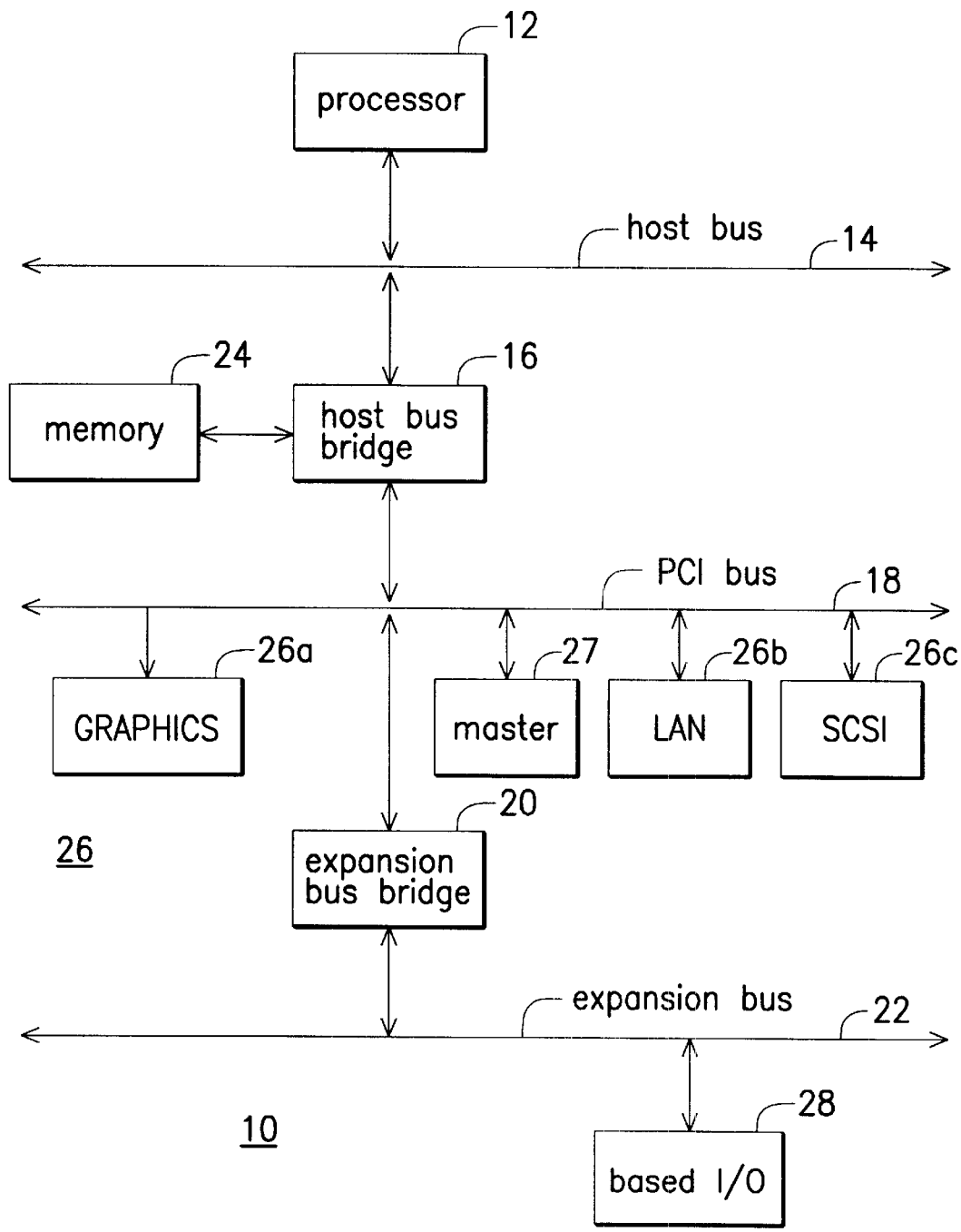
FIG. 1 is a block diagram of a computer system having a PCI bus and an expansion bus.
Figure 2:
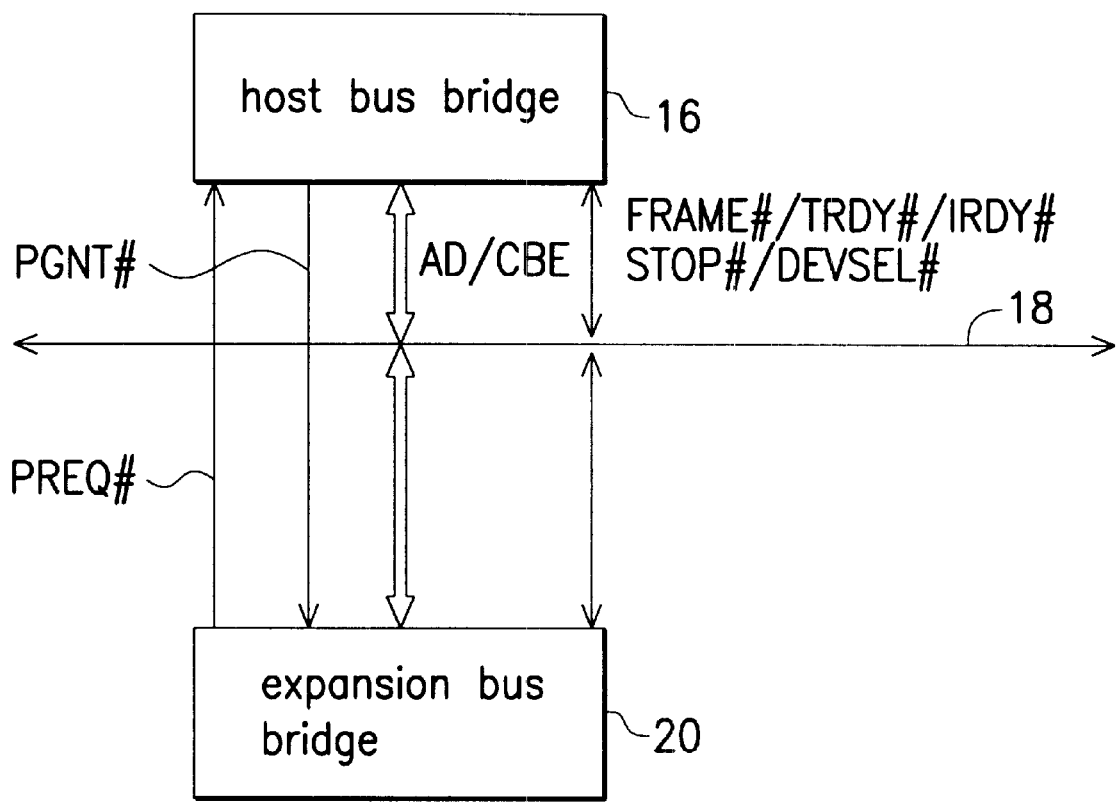
FIG. 2 is an illustrating diagram of a portion of a PCI interface.
Figure 3:
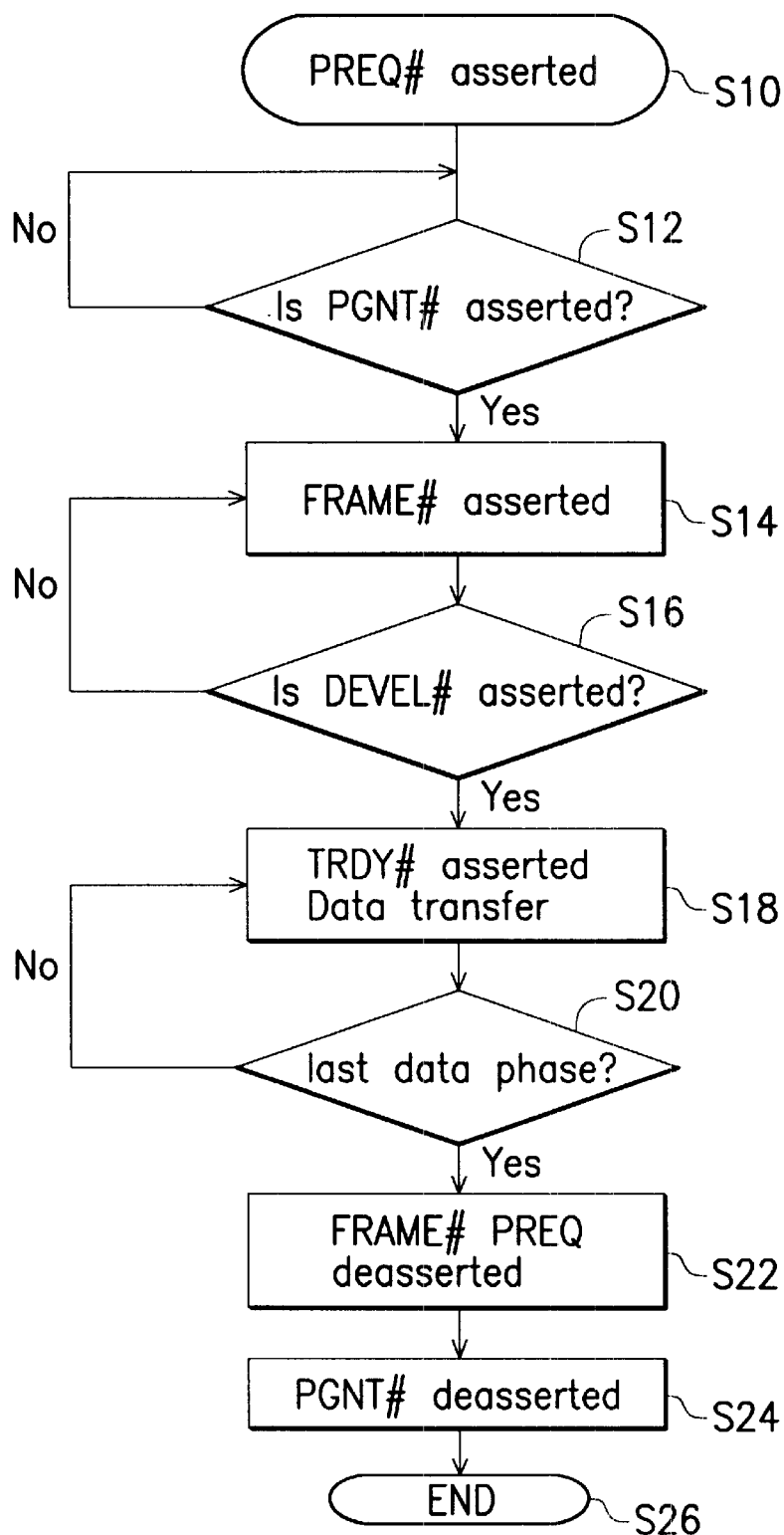
FIG. 3 is a flow chart of typical data transferring on a PCI bus.
Figure 4:
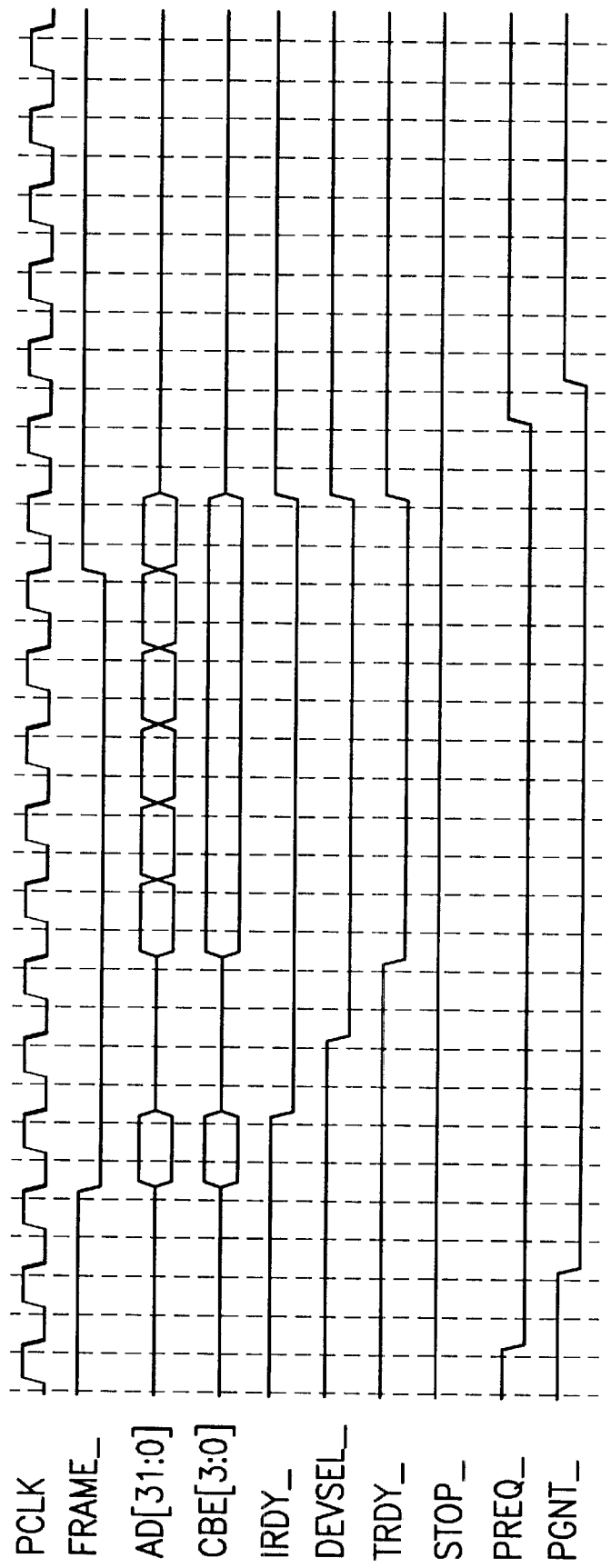
FIG. 4 is a timing diagram of conventional data transferring on a PCI bus.

According to the step S39, PREQ# of the master is driven into a data transfer strobe signal having a plurality of clocks. The number of the clocks corresponds to the number of times of the data transfers which occur on both the rising and falling edges of the clocks. More specifically, for example, six data transfers and three clocks of a data transfer strobe signal which is a square wave signal are shown in the timing diagram of FIG. 4, wherein the six data transfers occur on the six rising and falling edges of the three clocks. Consequently, transferring data on a PCI bus at a dual data transfer rate is possible.

According to the step S40, proceed to the next step when the current data phase is the last one of the current transaction.

According to step S42, FRAME# and PREQ# of the master are deasserted.

According to step S44, PGNT# of the target is deasserted.

Finally, According to step S46, the current transaction ends and the data transferring is completed.

Wherein a write transaction starts with an address phase when FRAME# is asserted. During the address phase, AD contain a valid address and CBE contain a valid bus command.

In addition, during a write transaction, IRDY# indicates that valid data is present on AD while TRDY# indicates that the target is prepared to accept data.

STOP# indicates the current target is requesting the master to stop the current transaction. (It is not asserted in the present embodiment.)

Figure 8:
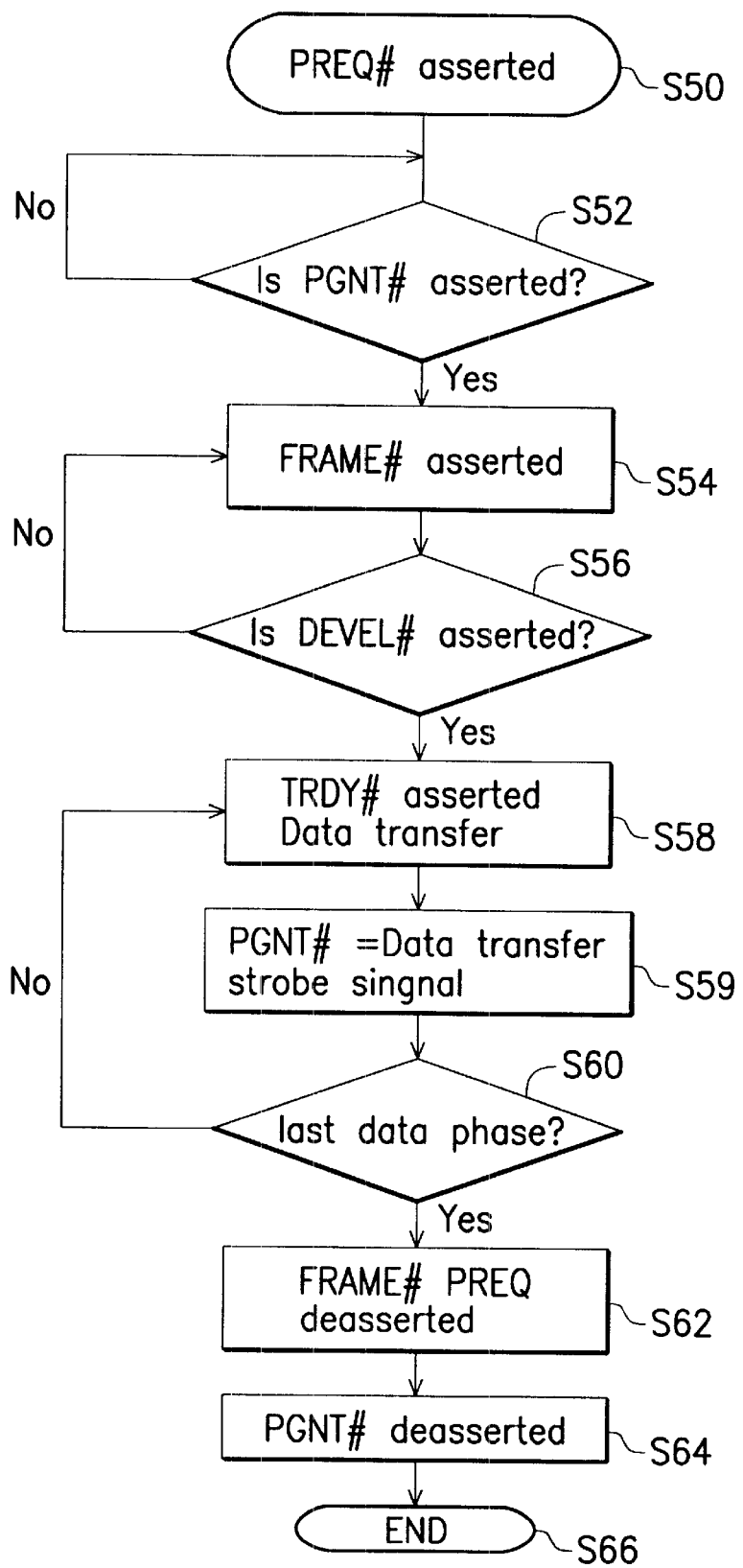
FIG. 8 is a flow chart of data transferring for a read transaction according to one of the embodiments of the invention.

Refer to the timing diagram in FIG. 6 together with FIG. 8, wherein an embodiment illustrating that the expansion bus bridge 20 becoming a master by winning the control of the PCI bus reads the memory through a target (i.e. a selected device) such as the host bus bridge 16. The procedure of data transferring includes:

According to the step S50, PREQ# of the master is asserted.

According to the step S52, proceed to the next step when PGNT# of the arbitrator is asserted.

According to the step S54, FRAME# of the master is asserted and the master begins to drive the address signal AD.

According to the step S56, proceed to the next step when DEVSEL# of the target is asserted.

According to the step S58, when TRDY# of the target is asserted, the target begins to drive the data signal AD and the first data transfer occurs.

According to the step S59, PGNT# of the target is driven into a data transfer strobe signal having a plurality of clocks. The number of the clocks corresponds to the number of times of the data transfers which occur on both the rising and falling edges of the clocks. More specifically, for example, six data transfers and three clocks of a data transfer strobe signal which is a square wave signal are shown in the timing diagram of FIG. 6, wherein the six data transfers occur on the six rising and falling edges of the three clocks. Consequently, transferring data on a PCI bus at a dual data transfer rate is possible.

According to the step S60, proceed to the next step when the current data phase is the last one of the current transaction.

According to step S62, FRAME# and PREQ# of the master are deasserted.

According to step S64, PGNT# of the target is deasserted.

Finally, According to step S66, the current transaction ends and the data transferring is completed.

Wherein a read transaction starts with an address phase when FRAME# is asserted. During the address phase, AD contain a valid address and CBE contain a valid bus command.

In addition, during a read transaction, IRDY# indicates that the master is prepared to accept data while TRDY# indicates that valid data is present on AD.

STOP# indicates the current target is requesting the master to stop the current transaction. (It is not asserted in the present embodiment.)

According to the configuration space in PCI devices, the status register having a plurality of bits(16 bits typically) is used to record status information for PCI bus related events. Since devices may implement the bits depending on device functionality and bit 0 to 4 are reserved, driving PREQ#/PGNT# into a data transfer strobe signal and performing data transfers on the rising and falling edges of the clocks can be defined by those reserved bits.

In conclusion, the method and system of transferring data on a PCI bus according to the invention having the advantages listed below:

(1) Additional pins are not required.
(2) Driving an idle signal into a data transfer strobe signal is not against the PCI protocol.
(3) A burst bus transfer mechanism is suitable.
(4) Dual edges data transfers may be replaced with typical data transfers as needed.
(5) Transferring data on a PCI bus at a higher data transfer rate is possible.
(6) Since PCI devices have a request(PREQ#)and grant (PGNT#)signal, a better device-to-device or point-to-point driving ability is provided, which makes the loading small and unvaried. PREQ#/PGNT# is suitable for a data transfer strobe signal in a non-arbitration phase such as a data phase, which is advantageous for the design of a high bandwidth device such as a PCI bus with a frequency of 66 MHz.

The embodiments described above are illustrative of the principles of the present invention and are not intended to limit the invention to the particular embodiments described. Those skilled in the art may make various changes in the embodiments without departing from the spirit and scope of the invention.

What i claimed is:

1. A method of performing data transfers on a PCI bus between a PCI bus master and a selected device, the PCI bus comprising a request signal and a grant signal for a read/write transaction, wherein the request signal and the grant signal are idle during the read/write transaction, the method comprising the steps of:

(a) driving a first ready signal by the PCI bus master;
(b) driving a second ready signal by the selected device in response to the first ready signal, which initiates the read/write transaction;

(c) using the request signal and the grant signal as a data transfer strobe signal during the write and read transaction, respectively, the data transfer strobe signal has a plurality of clocks; and (d) performing the data transfers on rising and falling edges of the clocks of the data transfer strobe signal.

2. The method of claim 1 wherein the request signal is output from the PCI bus master.

3. The method of claim 2 wherein the PCI bus master is a PCI/Expansion bus bridge.

4. The method of claim 2 wherein a Host/PCI bus bridge is coupled to the PCI bus.

5. The method of claim 4 wherein the selected device is the Host/PCI bus bridge.

6. The method of claim 5 wherein the grant signal is output from the Host/PCI bus bridge.

7. The method of claim 6 wherein the PCI/Expansion bus bridge write data into a memory through the Host/PCI bus bridge.

8. The method of claim 7 wherein the PCI/Expansion bus bridge read data from the memory through the Host/PCI bus bridge.

9. The method of claim 1 wherein the number of the clocks of the data strobe signal corresponds to the number of times of the data transfers to be performed.

10. The method of claim 9 wherein the data strobe signal is a square wave signal.

11. A system of performing data transfers on a PCI bus, comprising:

a Host/PCI bus bridge coupled to the PCI bus, sending out a grant signal;

a PCI bus master coupled to the PCI bus, sending out a request and a first ready signal;

a selected device coupled to the PCI bus, sending out a ready signal, which initiates a read/write transaction; and a memory coupled to the Host/PCI bus bridge;

wherein, the request signal is used as a data transfer strobe signal for the PCI bus master to write data into the memory during the write transaction, while the grant signal is used as the data transfer strobe signal for the PCI bus master to read data from the memory during the read transaction, the data transfer strobe signal has a plurality of clocks whose number corresponds to the number of times of the data transfers to be performed, and the data transfers is performed on rising and falling edges of the clocks of the data transfer strobe signal.

* * * * *